A. DOUGLASS.
Sewing Machine.
No. 19,080.
Patented Jan. 12, 1858.
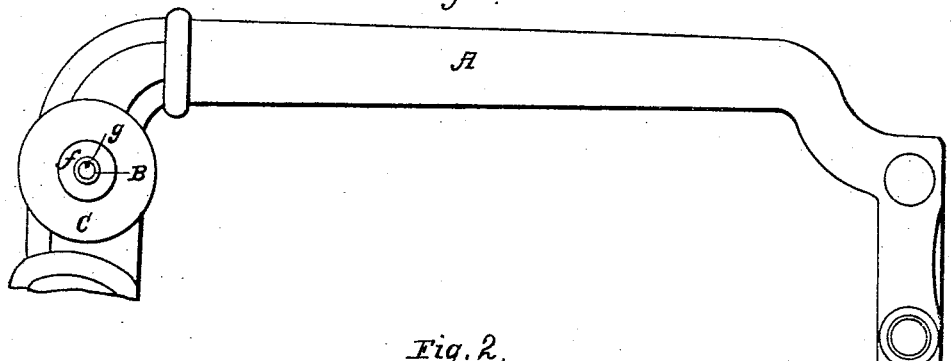
Fig. 1.
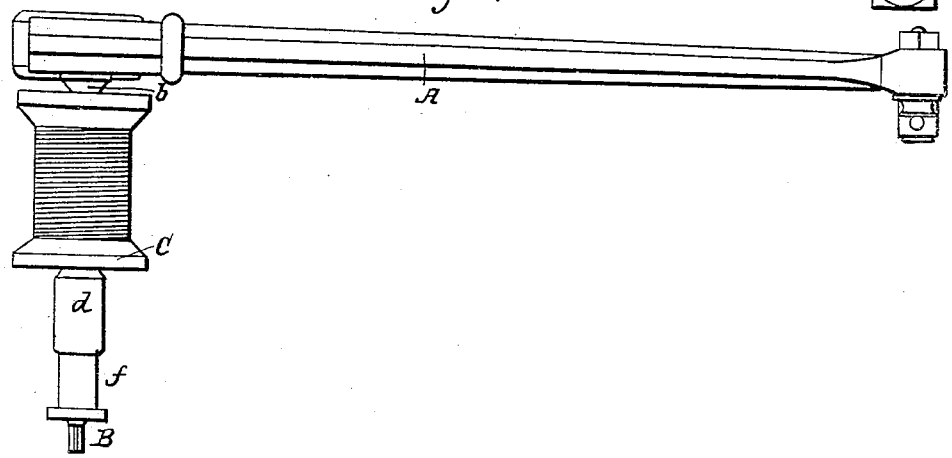
Fig. 2.
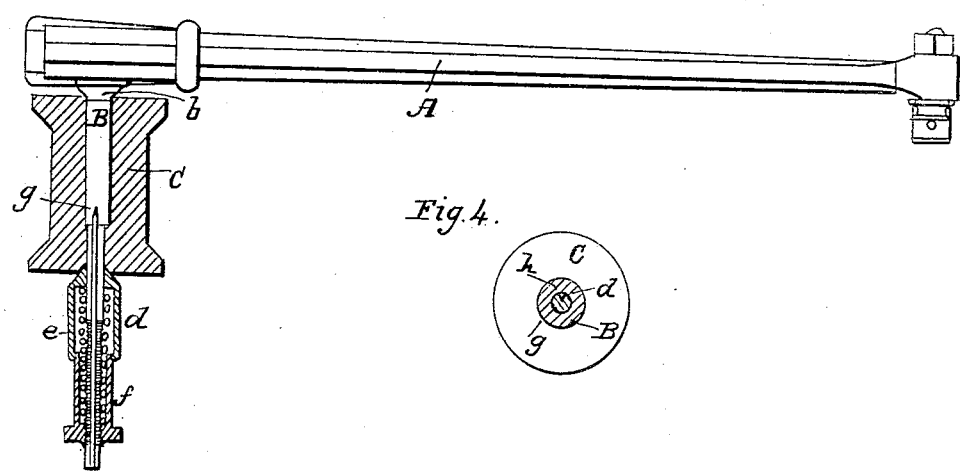
Fig. 3.
Fig. 4.

UNITED STATES PATENT OFFICE.

ALEXR. DOUGLAS, OF NEW YORK, N. Y.

IMPROVEMENT IN SEWING-MACHINES.

Specification forming part of Letters Patent No. 19,080, dated January 12, 1858.

*To all whom it may concern:*

Be it known that I, ALEXANDER DOUGLAS, of New York, in the county of New York and State of New York, have invented an Improvement in the Apparatus which Controls the Tension of the Thread in Sewing-Machines, the construction and operation of which I have described in the following specification and illustrated in the accompanying drawings with sufficient clearness to enable competent and skillful workmen in the arts to which it pertains or is most nearly allied to make and use my invention.

My said invention consists in the mode of constructing and combining one part of a cone chuck, a spring, and an adjusting-nut herein described, by which the apparatus is rendered more convenient to use and less liable to be lost, as hereinafter more fully set forth.

In the accompanying drawings, Figure 1 is an elevation of my apparatus and of the needle-arm to which it is attached. Fig. 2 is a plan of the same parts. Fig. 3 is a horizontal section, showing the internal construction of the particular parts.

A is the needle-beam, made as usual or in any other convenient form that may be considered desirable.

B is a fixed shaft or stud, upon which one part, $b$, of the chuck which controls the tension of the thread is formed, and to which the other parts are attached.

C is a thread-spool secured in position.

$d$ is the movable part of the conical chuck which holds the spool. This part $d$ is chambered round the shaft B to receive a spiral spring, $e$, and also the nut $f$ at its outer end. This nut $f$ has an enlargement at its extreme inner end, which fits loosely into the chamber in the cup part $d$ of the chuck. The outer end of this cup is turned very thin, so thin that it may be closed in slightly by turning it under the pressure of a burnisher or other suitable tool, somewhat after the manner that small wares are very commonly "spun up," as it is termed, in a lathe. After the part $d$ is made, the spring $e$ is first introduced, and after it the end of the nut $f$, and the outer end of the cup $d$ is partially closed in the manner above stated, care being taken not to close it so much as to cause it to bind upon the nut, and thereby to prevent the nut sliding freely into and out of the cup $d$. There is a key seat or groove, $g$, cut in the shaft B to receive the feather or point $h$, as shown in Fig. 4, which keeps the part $d$ from turning on the shaft B. The rotation of the thread-spool is thereby prevented from turning the nut $f$, and by that means changing the tension of the thread.

The combination of the part $d$ of the chuck, the spring $e$, and the nut $f$ in one inseparable piece avoids the necessity of placing the parts together and adjusting them in their relative positions at every change of spools, and the arrangement of the parts furnishes in the nut $f$ a good support for the outer end of the part $d$, to keep it true upon the shaft. The whole apparatus is thereby rendered more compact, and the removable parts, being secured together, are less liable to loss than they would otherwise be.

I am aware that the application of conical chucks and springs adjusted by a set-screw have been before used for regulating the tension of the thread in sewing-machines. I am also aware that the inner chuck has been made movable upon the shaft, and a spring made to press upon that to control the tension of the thread, instead of upon the part of the chuck upon the outer end of the shaft, which arrangement avoided the necessity of removing the spring each time that a fresh spool was put on, at the expense, however, of a considerable multiplication of parts. I therefore make no claim to the conical chuck, or, broadly, to its combination with springs and an adjusting-screw for regulating the tension of the thread.

The particular improvement which constitutes my said invention, and which I claim as having been originally and first invented by me, is—

The combination of the part $d$ of the chuck, the spring $e$, and the nut $f$, when united as one piece, substantially as described, for the purposes set forth.

ALEX. DOUGLAS.

Witnesses:
JOHN CRUMLY.
THOS. P. HOW.